US007373707B2

(12) United States Patent
Ouchiyama et al.

(10) Patent No.: US 7,373,707 B2
(45) Date of Patent: May 20, 2008

(54) MILLING APPARATUS

(75) Inventors: Ko Ouchiyama, Shiga (JP); Hirohito Nakanishi, Shiga (JP); Shigenobu Fukuda, Shiga (JP); Kanta Kambara, Shiga (JP)

(73) Assignee: Horizon International Inc., Shiga (JP)

( * ) Notice: Subject to any disclaimer, the term of this patent is extended or adjusted under 35 U.S.C. 154(b) by 0 days.

(21) Appl. No.: 11/796,105

(22) Filed: Apr. 26, 2007

(65) Prior Publication Data

US 2007/0251069 A1 Nov. 1, 2007

(30) Foreign Application Priority Data

Apr. 27, 2006 (JP) ............................ 2006-123112

(51) Int. Cl.
*B23P 23/04* (2006.01)
*B42C 5/04* (2006.01)

(52) U.S. Cl. .......................... 29/33.5; 83/694; 83/876; 83/934; 412/33; 409/232; 409/235; 270/58.08; 407/56

(58) Field of Classification Search .................. 83/472, 83/483, 486, 486.1, 487, 592, 614, 625, 644, 83/663, 671, 673, 694, 875, 876, 877, 934; 412/4–9, 16, 18, 19, 33, 37, 38; 29/33.5; 409/231, 232, 234, 235; 407/1, 33, 34, 56; 270/58.07, 58.08, 52.17, 52.18; 156/257, 156/908
See application file for complete search history.

(56) References Cited

U.S. PATENT DOCUMENTS 2,107,217 A * 2/1938 Salsman et al. ......... 140/92.93
2,610,449 A * 9/1952 Cargill ....................... 451/274
3,594,837 A * 7/1971 French ........................ 412/16
3,706,252 A * 12/1972 Hawkes et al. ............ 83/471.2
3,758,928 A * 9/1973 Blake ........................... 407/1
3,980,514 A * 9/1976 Rosette et al. .............. 156/539
4,072,083 A * 2/1978 Cesal ......................... 409/232
5,542,800 A * 8/1996 Detterman et al. ............ 412/8
6,077,016 A * 6/2000 Geiser et al. .................. 412/1
6,099,224 A * 8/2000 Uchida et al. ................. 412/9
6,206,358 B1 * 3/2001 Yamaguchi et al. ..... 270/52.02
6,286,403 B1 * 9/2001 Rosenthal et al. ............ 83/215
6,447,230 B1 * 9/2002 Takai et al. .................... 412/14
6,722,645 B2 * 4/2004 Lorenzi ................... 270/58.07
6,986,630 B2 * 1/2006 Marsh ........................... 412/1
7,014,182 B2 * 3/2006 Marsh ..................... 270/58.07
7,077,042 B2 * 7/2006 Nogawa et al. ............... 83/466
7,261,507 B2 * 8/2007 Horii et al. ................... 412/35
2006/0140743 A1 * 6/2006 Marsh ......................... 412/25

* cited by examiner

*Primary Examiner*—Dana Ross
(74) *Attorney, Agent, or Firm*—Kirschstein, et al.

(57) ABSTRACT

The milling apparatus (10) is arranged in such a manner that the deep groove cutter (21) is attached to the milling cutter (20) and the rotational drive shaft (23*a*) is approximately orthogonal to a spine (16*a*) of a sheet bundle (16) by the mechanism for tilting the drive apparatus (24) when an EVA-based hot melt adhesive is used. The milling apparatus (10) is arranged in such a manner that the shallow cutter (22) is attached to the milling cutter (20) and the rotational drive shaft (23*a*) is tilted with respect to a conveying direction of the sheet bundle (16) by the mechanism for tilting the drive apparatus (24) when a PUR-based holt melt adhesive is used.

3 Claims, 7 Drawing Sheets

A (PRIOR ART)

B (PRIOR ART)

MILLING APPARATUS

BACKGROUND OF THE INVENTION

1. Field of the Invention

The present invention relates to a milling apparatus incorporated in an adhesive book binding system executing a series of adhesive book binding process while conveying a sheet bundle.

2. Description of the Related Art

As shown in FIGS. 4 and 5, a conventional adhesive book binding system 1 includes a sheet bundle receiving section 2, a milling section 3, a bonding section 4, and a book cover attaching section 5. The adhesive book binding system 1 is configured to sequentially convey a sheet bundle 16 received at the sheet bundle receiving section 2 to each of the sections while clamping it by a clamper 6, thereby executing respective adhesive book binding processes.

The sheet bundle receiving section 2 receives the sheet bundle 16 formed by stacking sheets 15 supplied from a printer or a copier, etc. according to page number. In the sheet bundle receiving section 2, the sheet bundle 16 is clamped between a movable unit 7 and a fixed unit 8 of the clamper 6 in such a manner that the spine 16*a* of the sheet bundle 16 faces to a level plate 9 positioned under the clamper 6.

A milling apparatus 30 is arranged in the milling section 3. The milling apparatus has a disc-shaped milling cutter 31, and a drive apparatus 32 rotationally driving the milling cutter 31. The milling cutter 31 is provided with a large number of trimming blades 31*a* upwardly protruding from an outer periphery thereof, as shown in FIGS. 7A and 7B. The milling cutter 31 has groove cutting blades 31*b* or 31*c* upwardly protruding from an inner side in a radial direction thereof. The sheet bundle 16 passes through an upper side of the rotating milling cutter 31 with its spine 16*a* directed downward, whereby the spine 16*a* is trimmed by the trimming blades 31*a*, and grooves for adhesive bonding 16*b* or 16*c* are formed by the grove cutting blades 31*b* or 31*c*.

In the bonding section 4, an adhesive bonding by a bonding unit 11 is executed for the spine 16*a* of the sheet bundle 16 in which the grooves for adhesive bonding 16*b* or 16*c* are formed by the milling section 3.

In the book cover attaching section 5, a book cover 17 is fed onto nip plates 12 and 13 from a book cover storage (not shown), and is positioned at a predetermined position. The bonded sheet bundle 16 is placed on the positioned book cover 17. The book cover 17 is adhered to the spine 16*a* of the sheet bundle 16 by an ascent of the nip plates 12 and 13 and a bottom plate 14. At the same time, the spine 16*a* of the sheet bundle 16 is pressed firmly on both sides by a movement of the nip plates 12 and 13 coming close to each other. Accordingly, the book cover 17 is bent along the sheet bundle 16.

As an adhesive for binding the spine 16*a* of the sheet bundle 16, an ethylene vinyl acetate (EVA)-based hot melt adhesive is used generally. The EVA-based hot melt adhesive has an ethylene vinyl acetate copolymer as a raw material. Since the EVA-based hot melt adhesive can be repeatedly melted and cured, the EVA-based hot melt adhesive is easily handled and is excellent in a workability. However, the EVA-based hot melt adhesive has week adherence. Therefore, when using the EVA-based hot melt adhesive, as shown in FIGS. 6A and 7A, deep grooves 16*b* formed at a relatively coarse pitch are required on the spine 16*a* of the sheet bundle 16.

On the other hand, it is possible to a polyurethane reactive (PUR)-based hot melt adhesive as an adhesive for binding the spine 16*a* of the sheet bundle 16. Since the PUR-based hot melt adhesive does not melt again once it has cured, it is not easy to deal with the PUR-based hot melt adhesive. However, the PUR-based hot melt adhesive achieves a strong adherence when the reaction is finished. Therefore, when using the PUR-based hot melt adhesive, unlike the EVA-based hot melt adhesive, it is not necessary to form the deep grooves. In other words, when using the PUR-based hot melt adhesive, shallow grooves 16*c* as shown in FIGS. 6B and 7B are formed at a relatively fine pitch on the spine 16*a* of the sheet bundle 16.

Therefore, when forming the shallow grooves 16*c*, it is required to provide a milling apparatus 30 having a rotating shaft 31*d* of the milling cutter 31 tilted with respect to a conveying direction of the sheet bundle 16, as shown in FIG. 7B. Otherwise, the shallow grooves 16*c* formed in an upstream side in the conveying direction are again cut in a downstream side and lost.

On the contrary, the deep grooves 16*b* for the EVA-based hot melt adhesive are not necessarily formed at a fine pitch. Therefore, when forming the deep grooves 16*b* for the EVA-based hot melt adhesive, it is required to provide a milling apparatus 30 having a rotating shaft 31*d* of the milling cutter 31 approximately orthogonal to the conveying direction of the sheet bundle 16, as shown in FIG. 7A.

In other words, in order to selectively use the EVA-based hot melt adhesive and the PUR-based hot melt adhesive in the same adhesive book binding system, both the milling apparatus for forming the deep grooves and the milling apparatus for forming the shallow grooves are required. As a result, there is a problem that a space occupied by the milling apparatus is increased, and the adhesive book binding system becomes large in size.

SUMMARY OF THE INVENTION

Accordingly, an object of the present invention is to provide a milling apparatus incorporated in an adhesive book binding system, in which an EVA-based hot melt adhesive and a PUR-based hot melt adhesive can be selectively used without causing an increase in an occupied space.

In order to achieve the object mentioned above, in accordance with the present invention, there is provided a milling apparatus incorporated in an adhesive bookbinding system which executes a series of adhesive book binding processes while conveying a sheet bundle, and arranged underneath the conveying path of the sheet bundle for cutting a spine of the sheet bundle, the milling apparatus having: a drive apparatus having a rotational drive shaft extending upwardly; and a disc-shaped milling cutter concentrically connected to a top end of the rotational drive shaft and arranged in a plane perpendicular to the rotational drive shaft, the milling cutter being provided with a large number of trimming blades arranged along one circumference and protruding upwardly for trimming the spine of the sheet bundle, the milling apparatus characterized in that the milling cutter has at least one first groove cutting blade or at least one second groove cutting blade selectively attached to an inner side or an outer side in a radial direction with respect to a row of the trimming blades; the first groove cutting blade upwardly extending over the trimming blades and forming shallow grooves on the spine of the sheet bundle; the second groove cutting blade upwardly extending over the first groove cutting blade, and forming deep grooves on the spine of the sheet bundle; and that the milling apparatus further comprises a mechanism for tilting the drive apparatus in such a manner that the drive apparatus is arranged at a first position when the milling cutter has the second groove cutting blade, and that the drive apparatus is arranged at a second position when the milling cutter has the first groove cutting blade, the rotational drive shaft being positioned approximately orthogonal to the spine of the sheet bundle at the first position, the rotational drive shaft being tilted at a predetermined angle to the spine of the sheet bundle at the second position.

In accordance with a preferred aspect of the present invention, the mechanism for tilting the drive apparatus comprises: a frame; a horizontal shaft extending across the conveying direction and carried by the frame and arranged at an upstream side or a downstream side in the conveying direction in such a manner that the drive apparatus can be tilted around the shaft; and a cam arranged between the drive apparatus and the frame for moving the drive apparatus upwardly and downwardly so as to tilt the drive apparatus around the shaft.

In accordance with another preferred aspect of the present invention, a shallow groove for adhesive bonding by a PUR-based hot melt adhesive is formed by the first groove cutting blade on the spine of the sheet bundle, and a deep groove for adhesive bonding by an EVA-based hot melt adhesive is formed by the second groove cutting blade on the spine of the sheet bundle.

According to the present invention, there is provided a compact adhesive book binding system in which the EVA-based hot melt adhesive and the PUR-based hot melt adhesive can be selectively used with one milling apparatus.

DESCRIPTION OF THE PREFERRED EMBODIMENTS

A preferred embodiment of the present invention will be explained in detail with reference to the accompanying drawings.

Figure 3:
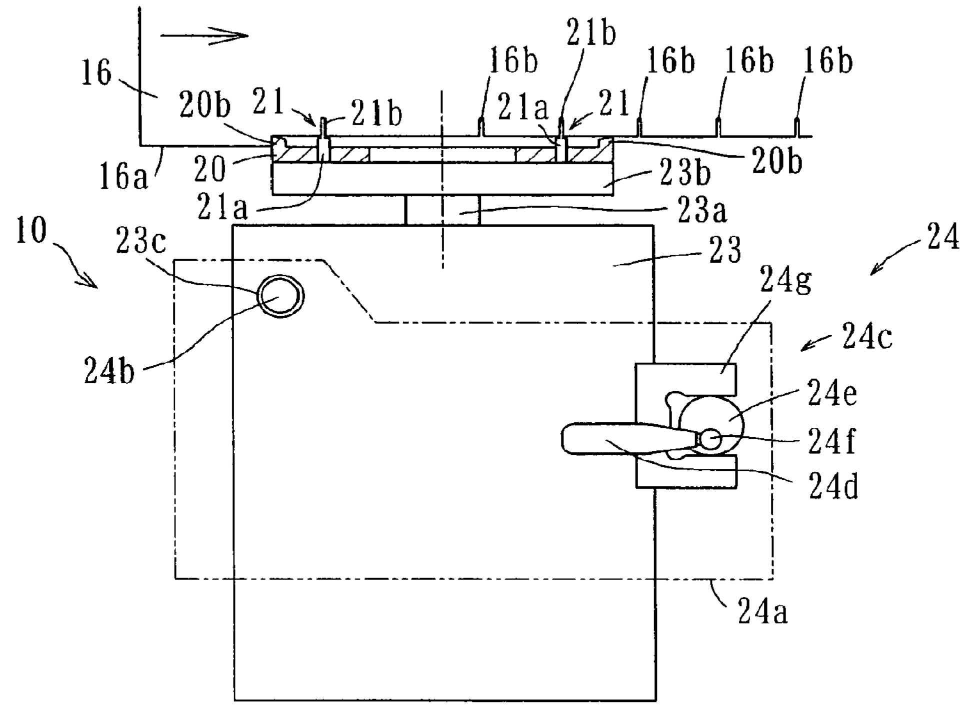
FIG. 3 is a cross sectional view of a main part showing a milling apparatus in accordance with the present invention.
Figure 3:
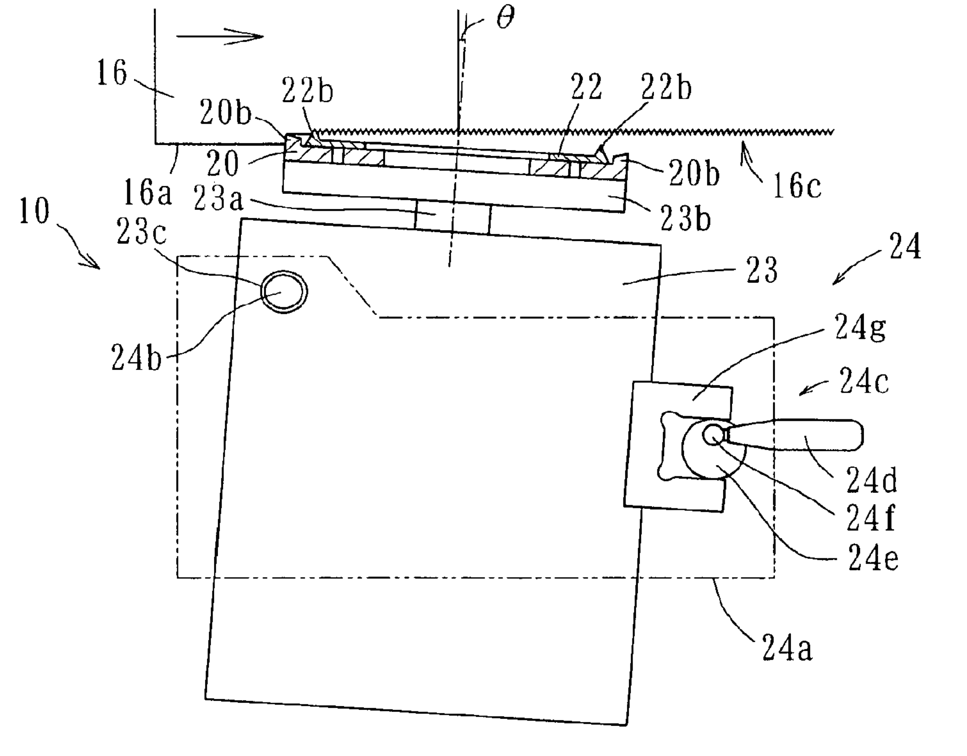
Figure 4:
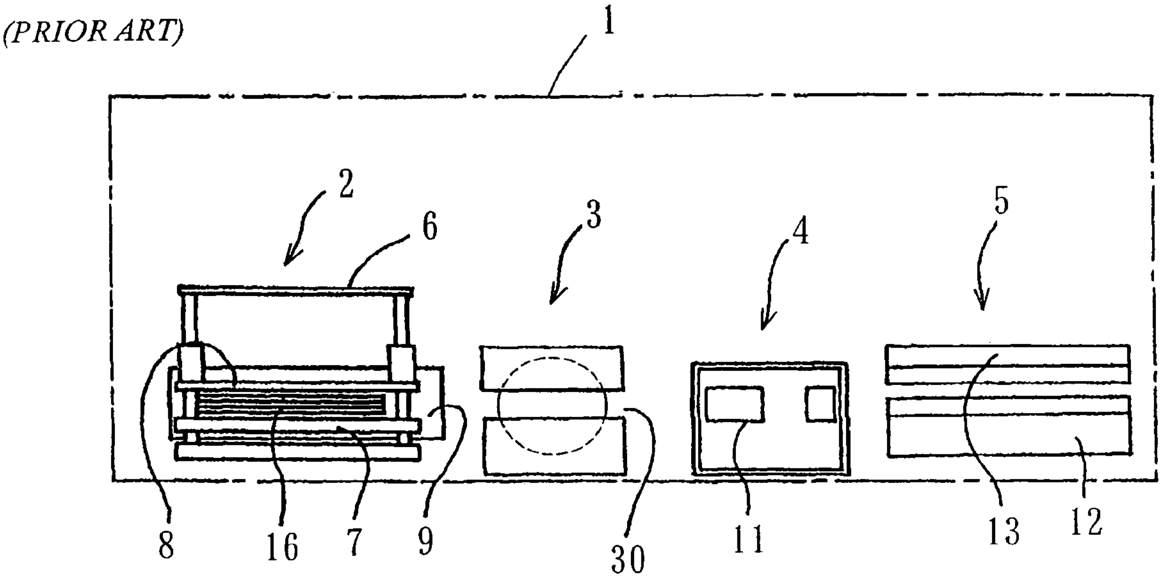
Fig. 4 (PRIOR ART)
FIG. 4 is a plan view schematically showing a conventional adhesive book binding system.
Figure 5:
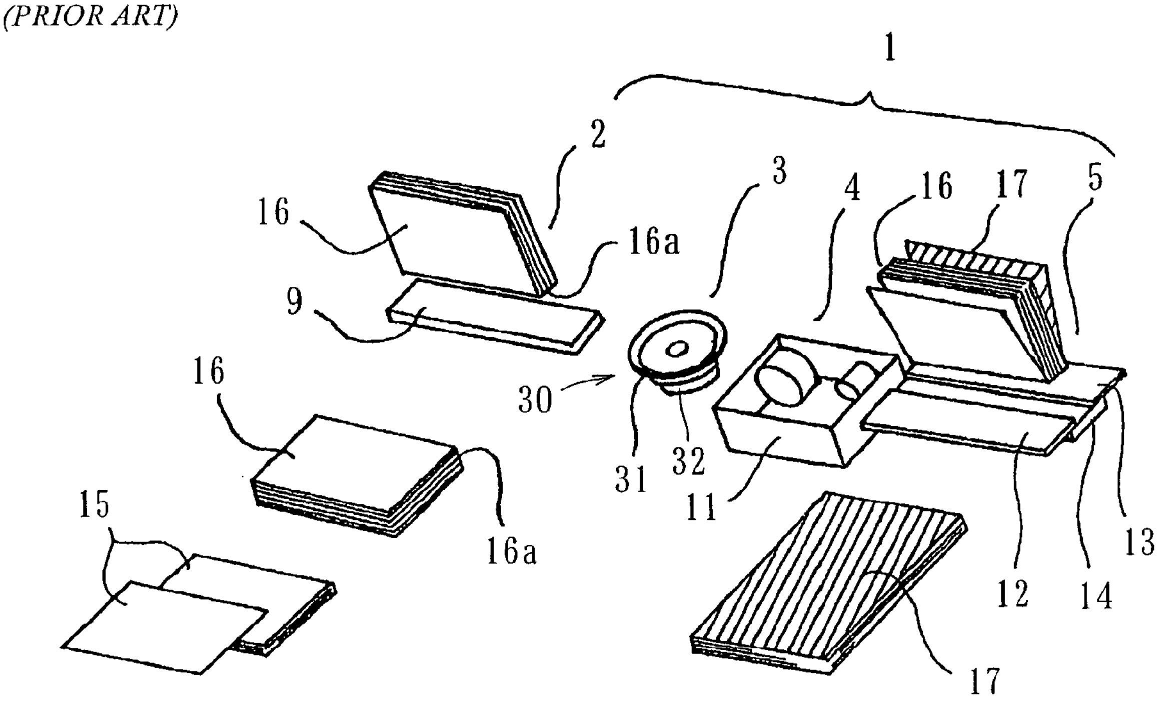
Fig. 5 (PRIOR ART)
FIG. 5 is a perspective view schematically showing a conventional adhesive book binding system.
Figure 6:
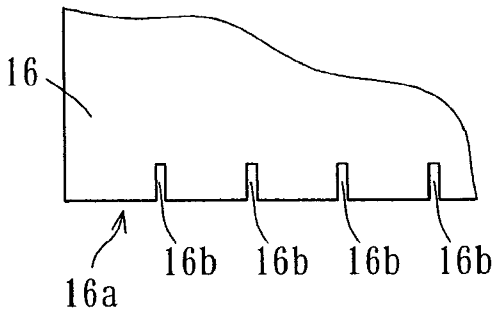
FIG. 6 is a side elevational view showing deep grooves and shallow grooves formed in a sheet bundle by the deep groove cutter or the shallow groove cutter.
Figure 6:
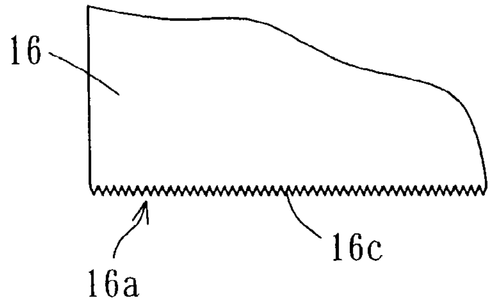
Figure 7:
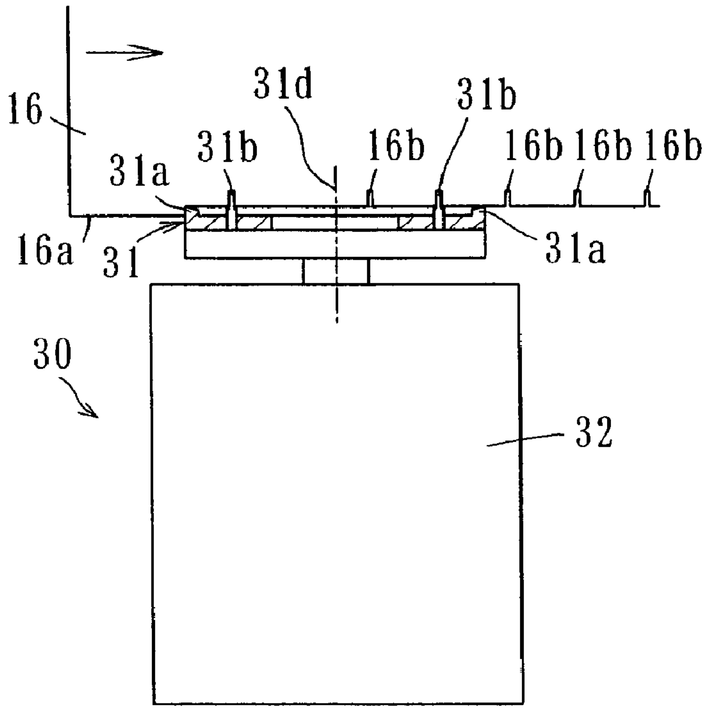
FIG. 7 is a cross sectional view of a main part showing a conventional milling apparatus.
Figure 7:
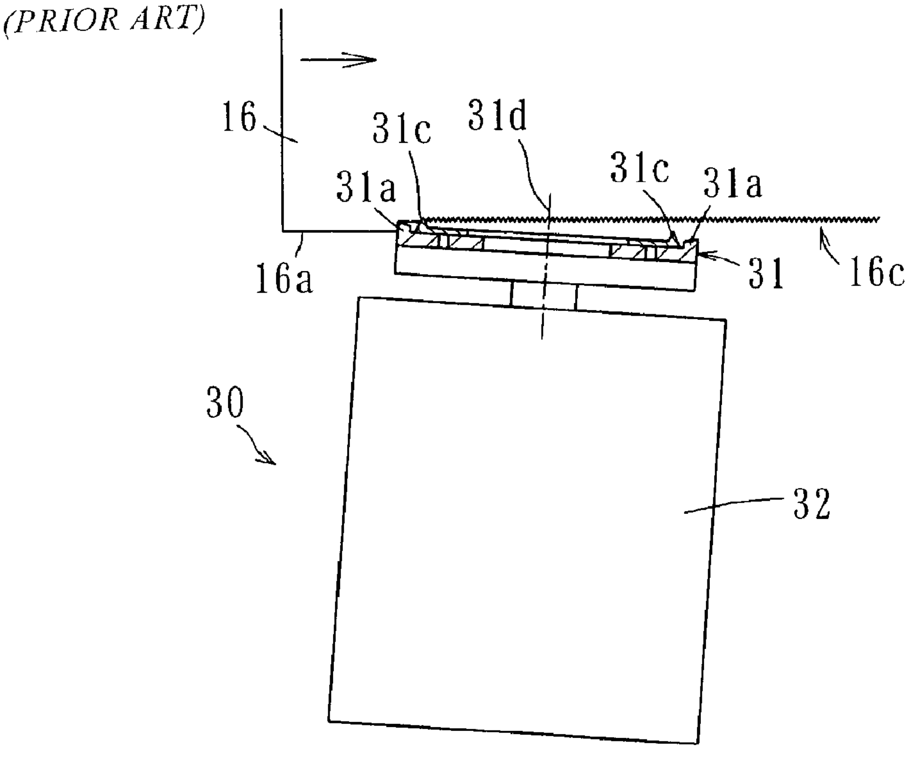

A milling apparatus 10 in accordance with the present invention is provided with a drive apparatus 23 having a rotational drive shaft 23*a* extending upwardly, a disc-shaped milling cutter 20 concentrically connected to a top end of the rotational drive shaft 23*a* and arranged in a plane perpendicular to the rotational drive shaft 23*a*, a shallow groove cutter 22 or a deep groove cutter 21 attached to an upper surface of the milling cutter 20, and a mechanism for tilting the drive apparatus 24, as shown in FIGS. 3A and 3B.

Figure 1:
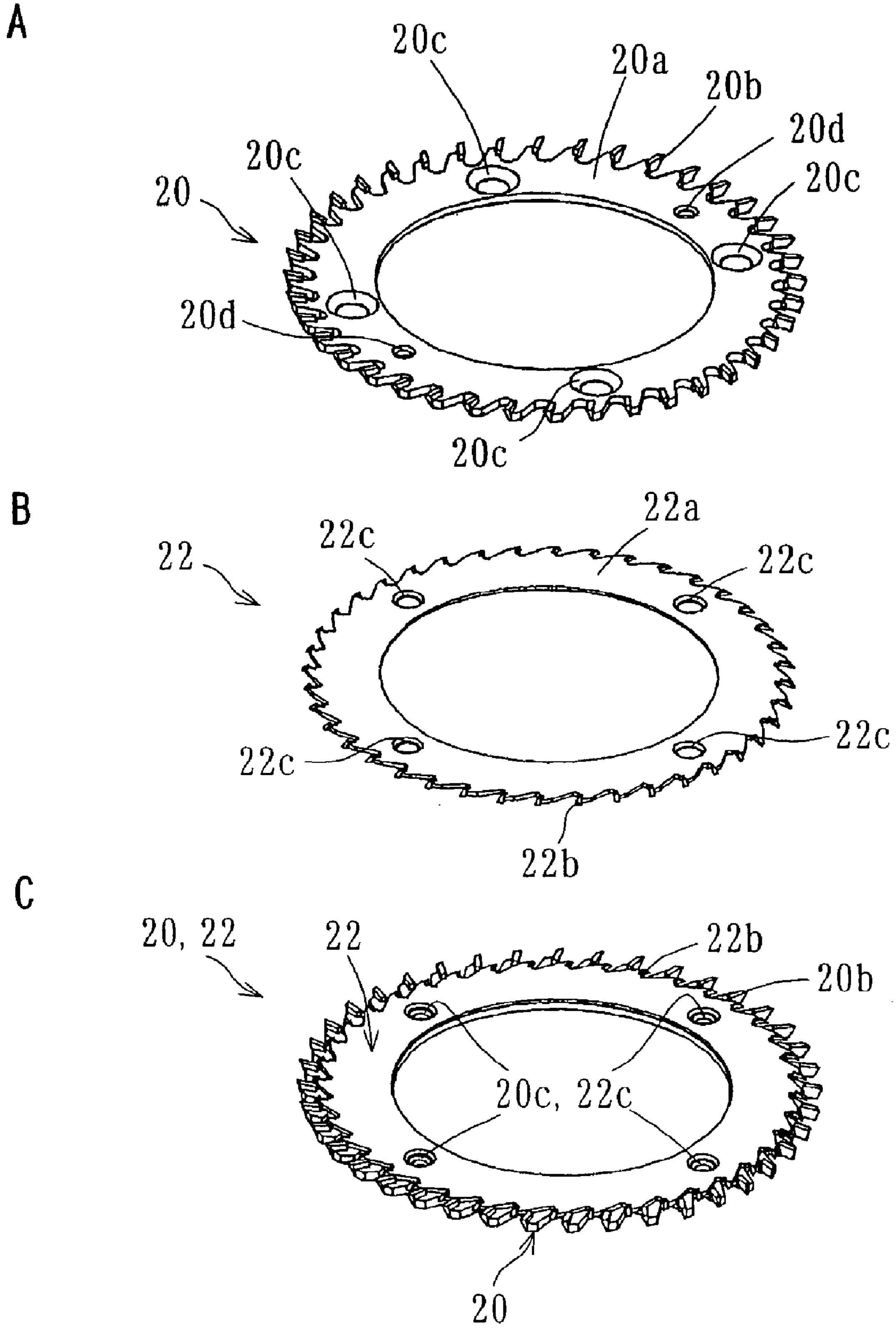
FIG. 1 is a perspective view showing a milling cutter, a shallow groove cutter and a combination thereof in accordance with the present invention.

The milling cutter 20 has an annular and tabular blade base 20*a*, and a large number of trimming blades 20*b* upwardly protruding from an outer periphery of the blade base 20*a*, as shown in FIG. 1A. The milling cutter 20 has a mounting hole 20*c* for attaching the shallow groove cutter 22 and a hole 20*d* for attaching the deep groove cutter 21, in an inner side of the trimming blades 20*b*. The milling cutter 20 can selectively attach the shallow groove cutter 22 or the deep groove cutter 21.

The shallow groove cutter 22 has an annular and tabular blade base 22*a*, and first groove cutting blades 22*b* upwardly protruding from an outer periphery of the blade base 22*a*, as shown in FIG. 1B. An outer diameter of the blade base 22*a* is smaller than an outer diameter of the milling cutter 20. An inner diameter of the blade base 22*a* is approximately equal to an inner diameter of the milling cutter 20. The first groove cutting blades 22*b* are formed in such a manner that they protrude upwardly over the trimming blades 20*b* of the milling cutter 20, when the shallow groove cutter 22 is attached to the milling cutter 20. The shallow groove cutter 22 has a hole 22*c* for being attached to the milling cutter 20.

The shallow groove cutter 22 is mounted on an upper surface of the milling cutter 20 as shown in FIG. 1C, and can be detachably attached by inserting a fixing tool such as a bolt through the hole 22*c* of the shallow groove cutter 22 and the mounting hole 20*c* of the milling cutter 20.

Figure 2:
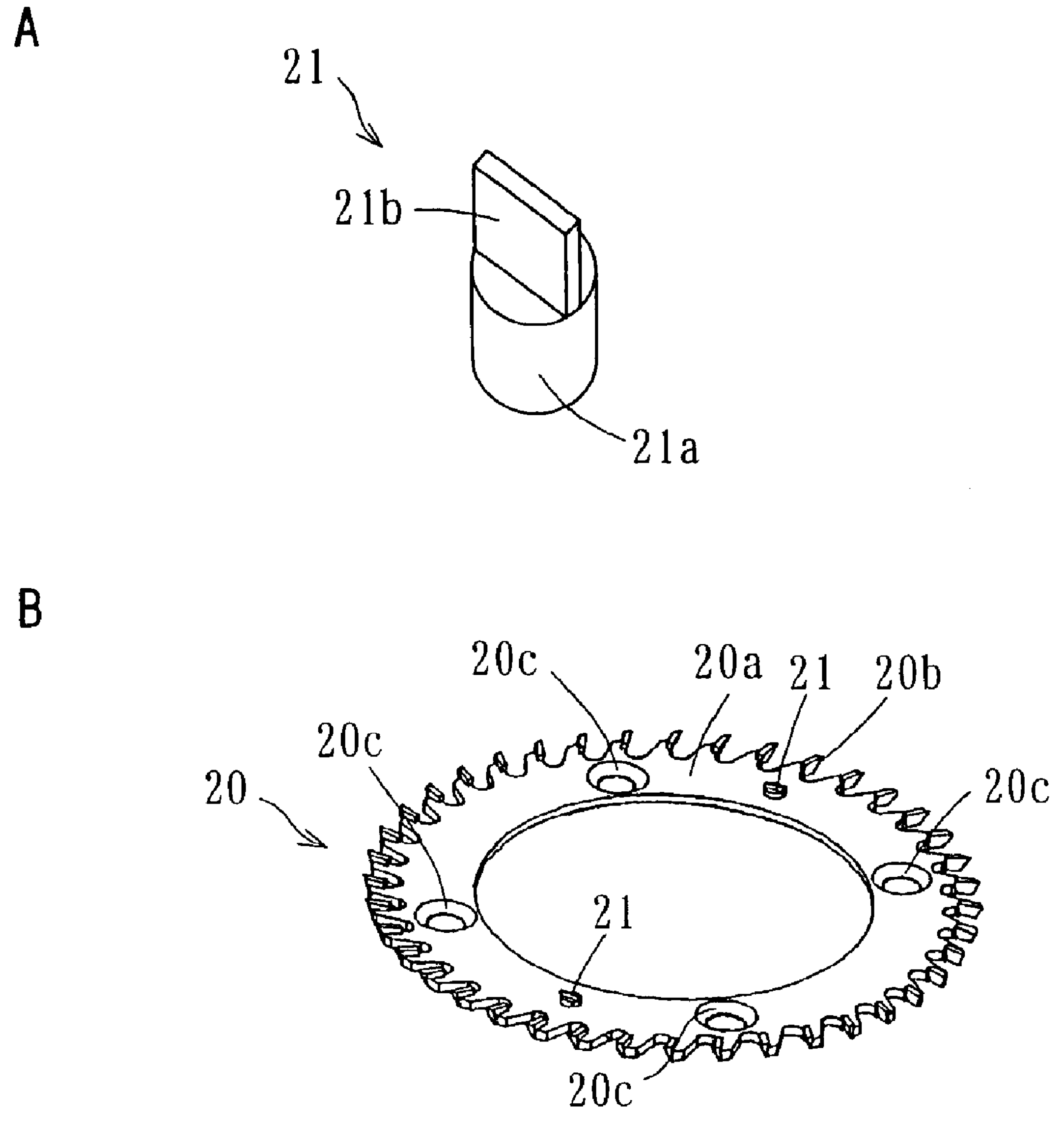
FIG. 2 is a perspective view showing a deep groove cutter and a combination of the deep groove cutter and the milling cutter in accordance with the present invention.

The deep groove cutter 21 is constituted by a columnar main body 21*a*, and a second groove cutting blade 21*b* provided at a top end of the main body 21*a*. The deep groove cutter 21 is detachably mounted to a hole 20*d* provided in the blade base 20*a* of the milling cutter 20, for example, by a screwing, as shown in FIG. 2B. The second groove cutting blade 21*b* is formed in such a manner that it protrudes upwardly over the first groove cutting blades 22*b* of the shallow groove cutter 22, when the deep groove cutter 21 is attached to the milling cutter 20.

The drive apparatus 23 has a rotational drive shaft 23*a* upwardly protruding, a support disc 23*b* coaxially attached to a top end of the rotational drive shaft 23*a*, and a shaft hole 23*c* provided in an upstream side in the conveying direction and through which a horizontal shaft 24*b* to be described below is inserted, as shown in FIGS. 3A and 3B. The milling cutter 20 is detachably mounted on an upper surface of the support disc 23*b*, by a fixing tool such as a bolt.

The mechanism for tilting the drive apparatus 24 has a fixed frame 24*a* and a cam 24*c* arranged between the frame 24*a* and the drive apparatus 23, as shown in FIGS. 3A and 3B. The horizontal shaft 24*b* is extending across the conveying direction and carried by the frame 24*a*. The horizontal shaft 24*b* is arranged at an upstream side in the conveying direction in such a manner that the drive apparatus 23 can be tilted around the horizontal shaft 24*b*. The cam 24*c* has a frame 24*g* provided in a downstream side of the drive apparatus 23, a cam body 24*e* received in the frame 24*g* and supporting the frame 24*g*, a rotating shaft 24*f* of the cam body 24*e*, and an operation lever 24*d* attached to an end portion of the rotating shaft 24*f*. The rotating shaft 24*f* is supported to the frame 24*a* approximately horizontally.

Next, an operation of the milling apparatus 10 in accordance with the present invention will be explained.

When the EVA-based hot melt adhesive is used, as shown in FIG. 3A, the milling cutter 20 and two deep groove cutters 21 are combined to be attached onto the support disc 23*b* of the drive apparatus 23.

Further, as shown in FIG. 3A, the rotating shaft 24*f* is rotated via the operation lever 24*d*, and the cam body 24*e* is set to an upward eccentric state. As a result, the drive apparatus 23 is arranged in such a manner that the rotational drive shaft 23*a* is approximately orthogonal to the spine 16*a* of the sheet bundle 16.

In this state, when the milling cutter 20 is rotated by the drive apparatus 23, the spine 16*a* of the sheet bungle 16 passing through the upper side is trimmed by the trimming blades 20*b* of the milling cutter 20.

Further, the deep groove 16*b* is formed on the spine 16*a* of the trimmed sheet bundle 16 by the second groove cutting blades 21*b* of the deep groove cutter 21 rotating together with the milling cutter 20. At this time, a rotating speed of the milling cutter 20 and a conveying speed of the sheet bundle 16 are adjusted in such a manner that the second groove cutting blades 21*b* intersect with the spine 16*a* of the sheet bundle 16 so as to be spaced. As a result, the deep grooves 16*b* are formed at a relatively coarse pitch on the spine 16*a* of the sheet bundle 16 passing through the upper side of the milling apparatus 10, as shown in FIG. 3A.

When the PUR-based hot melt adhesive is used, as shown in FIG. 3B, the milling cutter 20 and the shallow groove cutter 22 are combined to be attached onto the support disc 23*b* of the drive apparatus 23.

Further, as shown in FIG. 3B, the rotating shaft 24*f* is rotated via the operation lever 24*d*, and the cam body 24*e* comes to a state of being eccentric to a lower side. As a result, the drive apparatus 23 descends at a position supported to the cam body 24*e*, and is rotated around the horizontal shaft 24*b*. Further, the drive apparatus 23 is arranged at a position at which the rotational drive shaft 23*a* is tilted at an angle □with respect to the conveying direction of the sheet bundle 16.

In this state, when the milling cutter 20 is rotated by the drive apparatus 23, the spine 16*a* of the sheet bundle 16 passing through the upper side is trimmed by the trimming blades 20*b* of the milling cutter 20.

Further, the shallow grooves 16*c* are formed by the first groove cutting blades 22*b* of the shallow groove cutter 22 rotating together with the milling cutter 20, on the spine 16*a* of the trimmed sheet bundle 16. At this time, the rotating speed of the milling cutter 20 and the conveying speed of the sheet bundle 16 are adjusted in such a manner that the first groove cutting blades 22*b* intersects with the spine 16*a* of the sheet bundle 16 without being spaced. As a result, the shallow grooves 16*b* are formed at a relatively fine pitch, as shown in FIG. 3B, on the spine 16*a* of the sheet bundle 16 passing through the upper side of the milling apparatus 10.

In this case, since the rotational drive shaft 23*a* is tilted with respect to the conveying direction of the sheet bundle 16, it is possible to prevent the shallow grooves 16*c* temporarily formed in the upstream side from being cut again by the first groove cutting blades 22*b* in a downstream side and lost.

As mentioned above, the milling apparatus in accordance with the present invention is structured such that the rotational drive shaft of the drive apparatus can be tilted with respect to the conveying direction depending on the adhesive to be used by the mechanism for tilting the drive apparatus having the simple structure. Therefore, in milling apparatus on the basis of the present invention, it is possible to selectively use the EVA-based hot melt adhesive and the PUR-based hot melt adhesive, and it is possible to construct the adhesive book binding system compact.

The description is specifically given above of the embodiments in accordance with the present invention, however, the present invention is not limited thereto. The number of the deep groove cutter 21 is not limited to two, and it may be one, or may be three or more.

The first groove cutting blades 22*b* and the second groove cutting blades 21*b* may be arranged in an outer side in a radial direction of the trimming blades 20*b* of the milling cutter 20.

The mechanism for tilting the drive apparatus 24 is not limited to the structure using the cam mechanism, but may be structured such that the drive apparatus is moved up and down, for example, by a hydraulic mechanism or the like so as to be tilted.

The tilt of the drive apparatus 23 at the time of using the PUR-based hot melt adhesive may be a tilt to an upstream side or a tilt to a downstream side.

What is claimed is:

1. A milling apparatus (10) incorporated in an adhesive book binding system (1) which executes a series of adhesive book binding processes while conveying a sheet bundle (16), and arranged underneath the conveying path of said sheet bundle (16) for cutting a spine (16*a*) of said sheet bundle (16), said milling apparatus (10) having:

a drive apparatus (23) having a rotational drive shaft (23*a*) extending upwardly; and a disc-shaped milling cutter (20) concentrically connected to a top end of said rotational drive shaft (23*a*) and arranged in a plane perpendicular to said rotational drive shaft (23*a*), said milling cutter (20) being provided with a large number of trimming blades (20*b*) arranged along one circumference and protruding upwardly for trimming said spine (16*a*) of said sheet bundle (16), said milling apparatus characterized in that said milling cutter (20) has at least one first groove cutting blade (22*b*) or at least one second groove cutting blade (21*b*) selectively attached to an inner side or an outer side in a radial direction with respect to a row of said trimming blades (20*b*);

said first groove cutting blade (22*b*) upwardly extending over said trimming blades (20*b*) and forming shallow grooves (16*c*) on said spine (16*a*) of said sheet bundle (16);

said second groove cutting blade (21*b*) upwardly extending over said first groove cutting blade (22*b*), and forming deep grooves (16*b*) on said spine (16*a*) of said sheet bundle (16); and that said milling apparatus (10) further comprises a mechanism for tilting said drive apparatus (24) in such a manner that said drive apparatus (23) is arranged at a first position when said milling cutter (20) has said second groove cutting blade (21*b*), and that said drive apparatus (23) is arranged at a second position when said milling cutter (20) has said first groove cutting blade (22*b*), said rotational drive shaft (23*a*) being positioned approximately orthogonal to said spine (16*a*) of said sheet bundle (16) at said first position, said rotational drive shaft (23*a*) being tilted at a predetermined angle to said spine (16*a*) of said sheet bundle (16) at said second position.

2. The milling apparatus (10) according to claim 1, characterized in that said mechanism for tilting said drive apparatus (24) comprises:

a frame (24*a*);

a horizontal shaft (24*b*) extending across the conveying direction and carried by said frame (24*a*) and arranged at an upstream side or a downstream side in the conveying direction in such a manner that said drive apparatus (23) can be tilted around said shaft (24*b*); and a cam (24*c*) arranged between said drive apparatus (23) and said frame (24*a*) for moving said drive apparatus (23) upwardly and downwardly so as to tilt said drive apparatus (23) around said shaft (24*b*).

3. The milling apparatus (10) according to claim 1, characterized in that a shallow groove (16*c*) for adhesive bonding by a PUR-based hot melt adhesive is formed by said first groove cutting blade (22*b*) on said spine (16*a*) of said sheet bundle (16), and a deep groove (16*b*) for adhesive bonding by an EVA-based hot melt adhesive is formed by said second groove cutting blade (21*b*) on said spine (16*a*) of said sheet bundle (16).

* * * * *